United States Patent
Mihara

(10) Patent No.: US 9,903,318 B2
(45) Date of Patent: Feb. 27, 2018

(54) VALVE APPARATUS FOR FUEL TANK

(71) Applicant: PIOLAX, INC., Yokohama-shi (JP)

(72) Inventor: Kenta Mihara, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 53 days.

(21) Appl. No.: 14/971,843

(22) Filed: Dec. 16, 2015

(65) Prior Publication Data

US 2016/0177885 A1    Jun. 23, 2016

(30) Foreign Application Priority Data

Dec. 18, 2014  (JP) .................................. 2014-255889

(51) Int. Cl.
*F16K 24/04* (2006.01)
*F02M 25/08* (2006.01)
*F16K 27/07* (2006.01)

(52) U.S. Cl.
CPC .... *F02M 25/0836* (2013.01); *F02M 25/0872* (2013.01); *F16K 24/044* (2013.01); *F16K 27/07* (2013.01)

(58) Field of Classification Search
CPC ......... Y10T 137/7323; Y10T 137/7358; Y10T 137/3099; Y10T 137/86324; F02M 25/0836; F02M 25/0872; F16K 24/044; F16K 31/22; F16K 27/07
See application file for complete search history.

(56) References Cited

U.S. PATENT DOCUMENTS

| | | | | |
|---|---|---|---|---|
| 5,944,044 A * | 8/1999 | King | ............... | B60K 15/03519 137/202 |
| 8,042,564 B2 * | 10/2011 | Ando | ............... | B60K 15/03504 137/202 |
| 8,844,557 B2 * | 9/2014 | Matsuo | ............... | F16K 24/044 137/202 |
| 9,096,122 B2 * | 8/2015 | Kaneko | ............ | B60K 15/03519 |
| 9,333,851 B2 * | 5/2016 | Miura | .............. | B60K 15/03519 |
| 2006/0108000 A1 * | 5/2006 | Kaneko | ............... | F16K 24/044 137/202 |
| 2009/0288735 A1 | 11/2009 | Hirata | | |
| 2010/0319797 A1 * | 12/2010 | Eriksson | ............... | F16K 27/003 137/884 |

(Continued)

FOREIGN PATENT DOCUMENTS

JP            5265262 B2    8/2013

*Primary Examiner* — Jessica Cahill
(74) *Attorney, Agent, or Firm* — McGinn I.P. Law Group, PLLC

(57) ABSTRACT

One embodiment is related to a valve apparatus to be mounted on a fuel tank. The valve apparatus including: a housing including a ventilation chamber on a bottom face of which a first opening and a second opening are provided, and a valve chamber communicating with the first opening and disposed below the ventilation chamber, and a float valve disposed in the valve chamber. The housing includes a canister-connecting pipe communicating with the second opening. A standing wall is disposed on the bottom face of the ventilation chamber between a peripheral edge portion of the first opening and a peripheral edge portion of the second opening. And, an overhang wall portion extends from a side face of the standing wall toward the first opening, as viewed from above.

11 Claims, 10 Drawing Sheets

(56) References Cited

U.S. PATENT DOCUMENTS

| | | | |
|---|---|---|---|
| 2013/0075394 A1* | 3/2013 | Suzuki | F16K 24/044 220/86.2 |
| 2015/0068617 A1* | 3/2015 | Shimokawa | F16K 24/044 137/409 |
| 2016/0091107 A1* | 3/2016 | Kaneko | F16K 24/044 137/429 |

* cited by examiner

VALVE APPARATUS FOR FUEL TANK

CROSS-REFERENCE TO RELATED APPLICATION(S)

This application claims priority from Japanese Patent Application No. 2014-255889 filed on Dec. 18, 2014, the entire contents of which are incorporated herein by reference.

FIELD

The present invention relates to a valve apparatus to be mounted on a fuel tank of an automobile or the like, and prevents fuel from flowing out of the fuel tank.

BACKGROUND

For example, a valve apparatus is mounted on a fuel tank of an automobile, which is arranged to prevent fuel leaking out of the fuel tank when the automobile turns or gets inclined.

For example, a float valve apparatus may include a housing, a float valve, an upward urging spring and a support spring (for example, see JP-5265262-B). The housing may include a lower space and an upper space that are divided via a partition wall, a ventilation pipe mounted on an outer wall of the upper space, an opening portion disposed in the partition wall, and a valve seat disposed on a lower face of the opening portion. The float valve may be disposed in the lower space so as to be slidable in the vertical direction. The upward urging spring may be disposed between a lower face of the float valve and a bottom face of the housing, and arranged to urge the float valve toward the opening portion of the partition wall. The support spring may be disposed inside the upward urging spring, and arranged to support the float valve such that the lower face of the float valve is not brought into contact with the bottom face of the housing when the float valve is moved to the lowest position.

In addition, a wall portion standing at a predetermined height may be provided to the peripheral edge portion of the partition wall of the housing. Meanwhile, the ventilation pipe may extend from the outer periphery of the housing in the radial outer direction. The passage on the base end side of the ventilation pipe may extend upward along the axial direction of the housing, and the opening at the upper end of the ventilation pipe may be disposed at a position matching with the upper end of the wall portion at the peripheral edge portion of the partition wall (for example, see FIG. 3 of JP-5265262-B).

In such float valve apparatus, when the float valve is immersed in fuel due to turn or inclination of the vehicle, the float is raised by buoyant force of the float valve or the urging force of the upward urging spring to close the opening portion of the partition wall, which prevents the fuel from flowing into the upper space through the opening portion.

In the above-described configuration, for example, when the fuel strongly sways, the float valve may not be raised in time so that the fuel sometimes flows into the upper space through the opening portion of the partition wall. In this case, the wall portion standing at the peripheral edge portion of the partition wall blocks the opening at the upper end of the ventilation pipe and prevents the fuel from flowing thereinto. However, vigorously flowing into the upper space, the fuel might overflow from the peripheral edge portion of the partition wall of the wall portion, and might flow into the opening at the upper end of the ventilation pipe.

SUMMARY

A first aspect of the present invention provides,
a valve apparatus to be mounted on a fuel tank, the valve apparatus including:
a housing including a ventilation chamber on a bottom face of which a first opening and a second opening are provided, and a valve chamber communicating with the first opening and disposed below the ventilation chamber, and
a float valve disposed in the valve chamber in a vertically movable manner so as to open and close the first opening,
wherein the housing includes a canister-connecting pipe extending so as to receive a pipe thereon, the pipe being connected to a canister which is provided outside of the fuel tank, the canister-connecting pipe communicating with the second opening,
wherein a standing wall is disposed on the bottom face of the ventilation chamber between a peripheral edge portion of the first opening and a peripheral edge portion of the second opening, and
wherein an overhang wall portion extends from a side face of the standing wall toward the first opening, as viewed from above.

A second aspect of the present invention provides, based on the above configuration,
the valve apparatus,
wherein the overhang wall portion is extended and inclined such that a distal end side of an upper face of the overhang wall portion is nearer to the peripheral edge portion of the first opening as compared with a base end side thereof.

A third aspect of the present invention provides, based on the above configuration,
the valve apparatus,
wherein a passage is provided between the distal end of the overhang wall portion to the peripheral edge portion of the second opening, and
wherein a bottom face of the passage includes a portion higher than the peripheral edge portion of the second opening.

A fourth aspect of the present invention provides, based on the above configuration,
the valve apparatus,
wherein the canister-connecting pipe is distanced with respect to a peripheral wall of the housing which forms the valve chamber.

According to the above-mentioned valve apparatus, because the standing wall that is disposed between the peripheral edge portion of the first opening and the peripheral edge portion of the second opening on the bottom face of the housing, and the overhang wall portion that extends from the side face of the standing wall toward the first opening are provided, a liquid reservoir space can be provided between the standing wall and the overhang wall portion. Thus, when the vehicle sways or gets inclined and the fuel flows into the ventilation chamber from the first opening, the fuel flowing thereinto can be dammed inside the liquid reservoir space, and thus can be made not to easily flow toward the second opening communicating with the canister-connecting pipe.

DETAILED DESCRIPTION

Hereinafter, a valve apparatus for a fuel tank according to one embodiment will be described referring to FIGS. 1 to 4.

Figure 1:
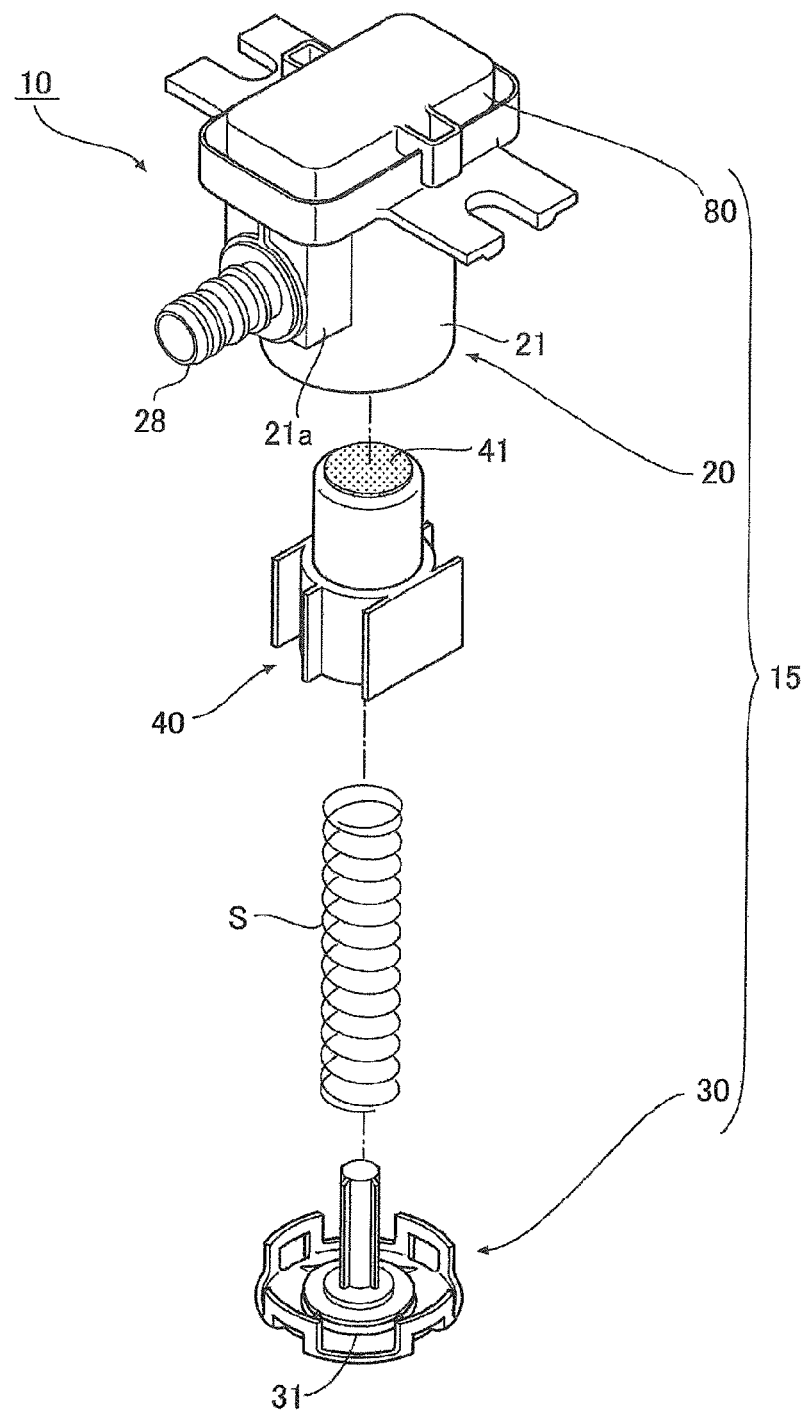
FIG. 1 is an exploded perspective view of a valve apparatus for a fuel tank according to one embodiment.

As shown in FIG. 1, a valve apparatus 10 for a fuel tank in the present embodiment (hereinafter, referred to simply as the "valve apparatus 10") includes a housing 15 including a ventilation chamber R including a first opening 23 and a second opening 24 on its bottom face, and a valve chamber V communicating with the first opening 23 and disposed below the ventilation chamber R.

As shown in FIG. 1, the housing 15 in the present embodiment includes a casing 20 having a cylindrical shape, a cap 30 mounted on the lower opening portion of the casing 20, and a ceiling wall 80 disposed above the casing 20.

Figure 2:
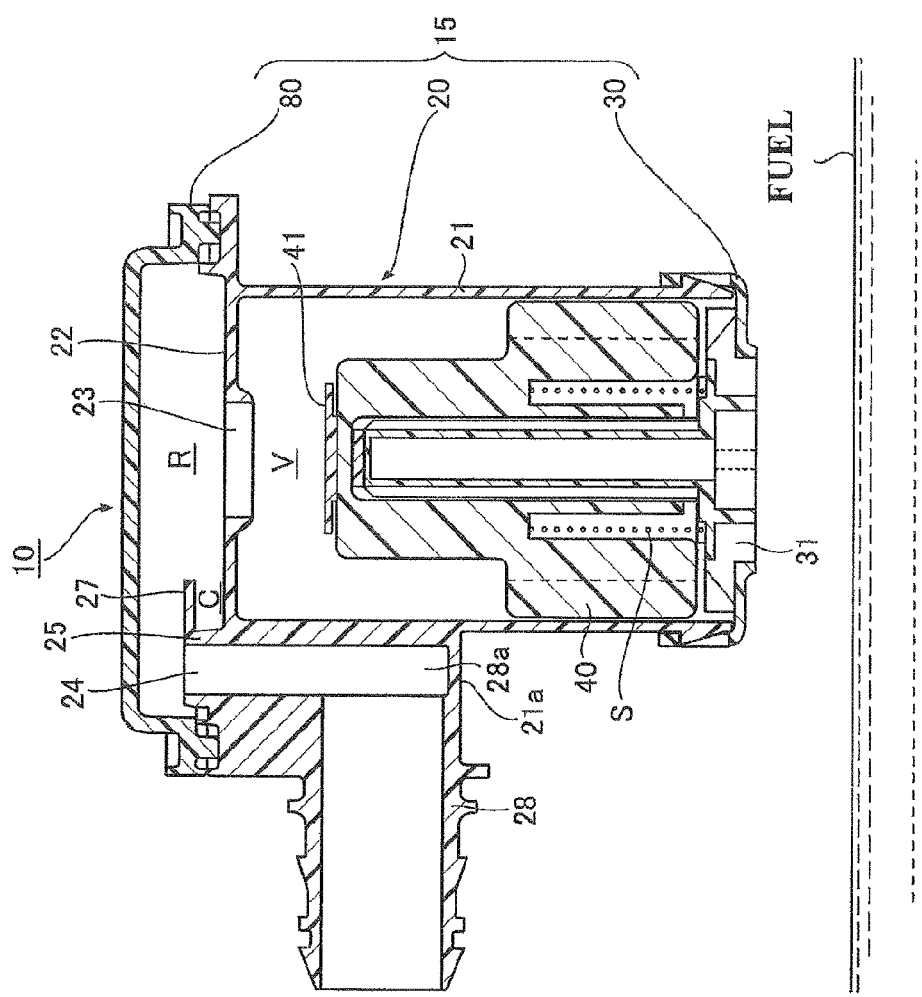
FIG. 2 is a cross-sectional view of the valve apparatus.

As shown in FIG. 2, the casing 20 includes a peripheral wall 21 having an approximately circular cylindrical shape with its lower portion opened, and a partition wall 22 disposed above the peripheral wall 21. The ceiling wall 80 is fixed to the upper portion of the casing 20 by welding or the like, and the ventilation chamber R is defined between the ceiling wall 80 and the partition wall 22.

The partition wall 22 includes the first opening 23. The first opening 23 is provided in the bottom face of the ventilation chamber R. The valve chamber V is disposed below the first opening 23, and the ventilation chamber R communicates with the valve chamber V through the first opening 23.

Figure 3:
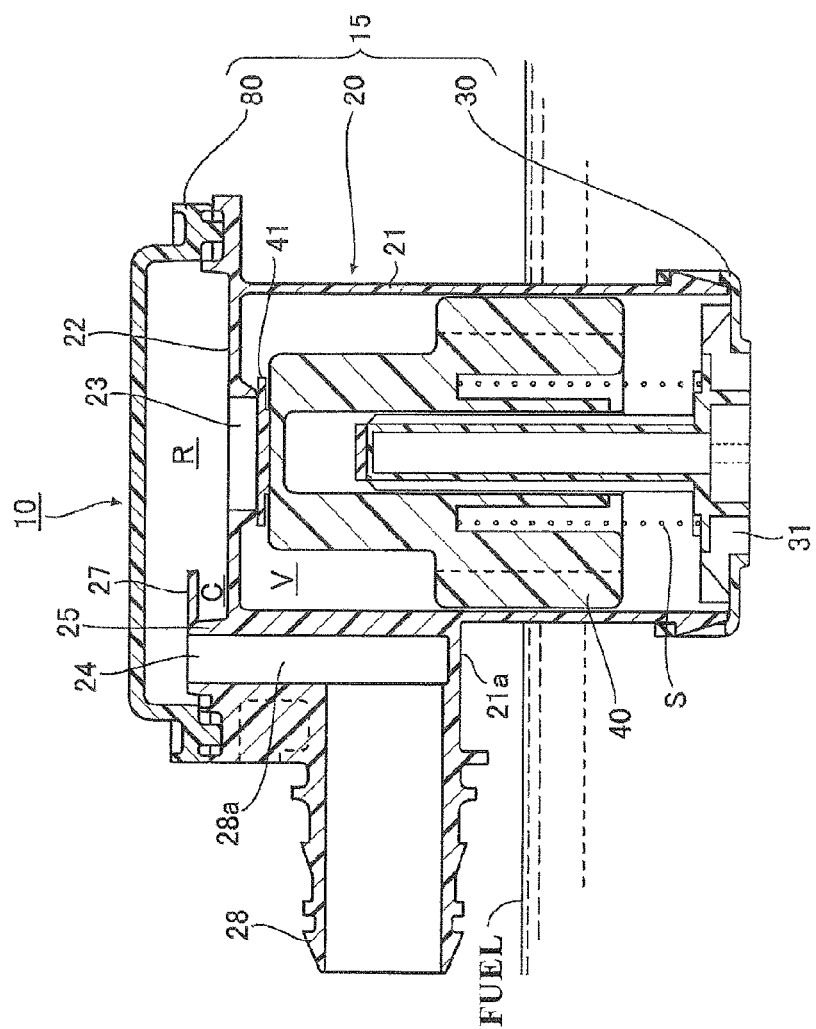
FIG. 3 is a cross-sectional view of the valve apparatus in a state where the float valve ascends.

The second opening 24 is disposed on the bottom face of the ventilation chamber R, the second opening 24 functioning as a fuel vapor discharge outlet arranged to discharge a fuel vapor that flows into the ventilation chamber R toward the canister outside of the fuel tank. As shown in FIG. 2 and FIG. 3, the peripheral edge portion of the second opening 24 is disposed at a position higher than the peripheral edge portion of the first opening 23 with respect to the axial direction of the casing 20.

A canister-connecting pipe 28 is provided to the peripheral wall 21 of the casing 20 so as to extend therefrom, and is used to be connected to a pipe connected to a canister (not illustrated) disposed outside of the fuel tank. As shown in FIG. 2, the canister-connecting pipe 28 has the shape of extending at an approximately right angle in the radial outer direction of the casing 20 from the outer peripheral face of a potion 21a of the peripheral wall 21 of the casing 20, the portion 21a being swollen so as to have a box shape. A passage 28a of the canister-connecting pipe 28, the passage 28a being disposed on the base end side inside the peripheral wall 21 (see FIG. 2), extends upward along the axial direction of the casing 20, and the opening at the upper end of the passage 28a communicates with the second opening 24.

As shown in FIG. 2, a standing wall 25 is provided between the peripheral edge portion of the first opening 23 and the peripheral edge portion of the second opening 24 on the bottom face of the ventilation chamber R.

An overhang wall portion (eave wall portion) 27 that extends from the side face of the standing wall 25 toward the first opening 23 is provided. The overhang wall portion 27 in the present embodiment extends at a predetermined length from the upper end on the outside face of the standing wall 25 (that is, from the position matching with the second opening 24). As a result, a liquid reservoir space C is provided in the space surrounded by the partition wall 22, the standing wall 25, and the overhang wall portion 27, and liquid fuel flowing into the ventilation chamber R from the first opening 23 stands in the liquid reservoir space C.

Hereinafter, "fuel" means liquid fuel (including fuel droplets), and "fuel vapor" means evaporated fuel.

The cap 30 including a through-hole 31 in its bottom face is mounted on the lower opening portion of the casing 20, whereby the valve chamber V is defined. A float valve 40 is disposed in a vertically movable manner in the valve chamber V while a spring S interposed between the float valve 40 and the cap 30. A valve head 41 made from an elastic material is mounted on the upper end portion of the float valve 40.

In the state of being not immersed in fuel as shown in FIG. 2, the float valve 40 compresses the spring S by its own weights to be placed on the cap 30 while the first opening 23 is kept open. When the fuel level in the fuel tank rises in this state, and the float valve 40 is immersed in fuel, the float valve 40 ascends by the urging force of the spring S and the buoyant force of the float valve 40 itself. Thus, the valve head 41 of the float valve 40 closes the first opening 23 (see FIG. 3).

Next, operation and effect of the valve apparatus 10 will be described.

In a state where the fuel level is yet to rise and the float valve 40 is not immersed in fuel, the first opening 23 is open as shown in FIG. 2.

When the vehicle turns or gets inclined greatly to raise the fuel level in the fuel tank, the fuel flows into the valve chamber V through the through-hole 31 of the cap 30. Then, when immersed in fuel at or over a predetermined height, the float valve 40 floats by the buoyant force of the second spring S and the float valve 40 itself. Thus, the valve head 41 closes the first opening 23 of the partition wall 22 as shown in FIG. 3, so that the fuel is blocked from flowing into the ventilation chamber R through the first opening 23, which can prevent the fuel from leaking out of the fuel tank through the first opening 23.

Figure 4:
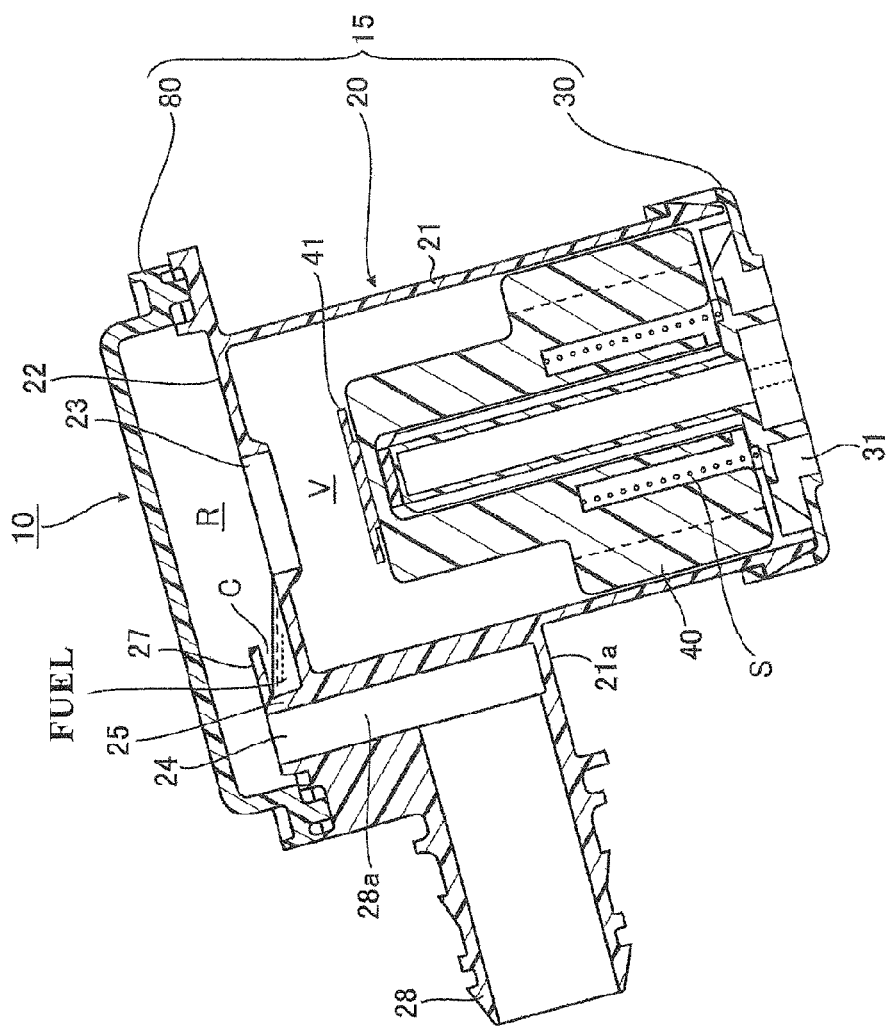
FIG. 4 is a cross-sectional view of the valve apparatus in a state where the vehicle is inclined.

Incidentally, when the vehicle runs on rough roads to vibrate up and down or sway side by side or makes a sharp turn, the float valve 40 cannot close the first opening 23 in time, and the fuel or fuel droplets could vigorously flow into the ventilation chamber R through the first opening 23. Shown in FIG. 4 is a state where the vehicle is inclined at a predetermined angle, and a part of the fuel leaks into the ventilation chamber R through the first opening 23.

Even in such a case, the liquid reservoir space C is provided in the space surrounded by the bottom face of the ventilation chamber R, the standing wall 25, and the overhang wall portion 27 in the valve apparatus 10. Therefore, the fuel flowing into the ventilation chamber R from the first opening 23 can be dammed inside the liquid reservoir space C. As a result, the fuel may not easily flow toward the second opening 24 that is communicating with the canister-connecting pipe 28, which can prevent the fuel from flowing into the canister that is disposed outside of the fuel tank.

In the present embodiment, because the peripheral edge portion of the second opening 24 is disposed at the position higher than the peripheral edge portion of the first opening 23 with respect to the axial direction of the casing 20 as shown in FIG. 2 and FIG. 3, the fuel flowing into the ventilation chamber R from the first opening 23 may not easily flow toward the second opening 24, which can more effectively prevent the fuel from flowing into the canister.

In the above-described embodiment, the float valve 40 functions as a so-called fuel outflow preventive valve that closes, when the fuel level in the fuel tank abnormally rises because of sway of the fuel or the like, the first opening 23 and prevents the fuel from leaking outside. Alternatively, the float valve 40 may be functioning as a so-called excess-feeding regulation valve that closes, when the fuel level in the fuel tank reaches a predetermined full fuel level, the first opening 23 and prevents fuel from being excessively fed. Thus, the float valve 40 is not specifically limited (same applies to the embodiment shown in FIGS. 5 to 10).

A valve apparatus for a fuel tank according to another embodiment will be described with reference to FIGS. 5 to 10. The same reference numerals are provided to the constituent elements that are substantially same as those in the above-described embodiment, and explanations of those constituent elements are omitted.

Figure 5:
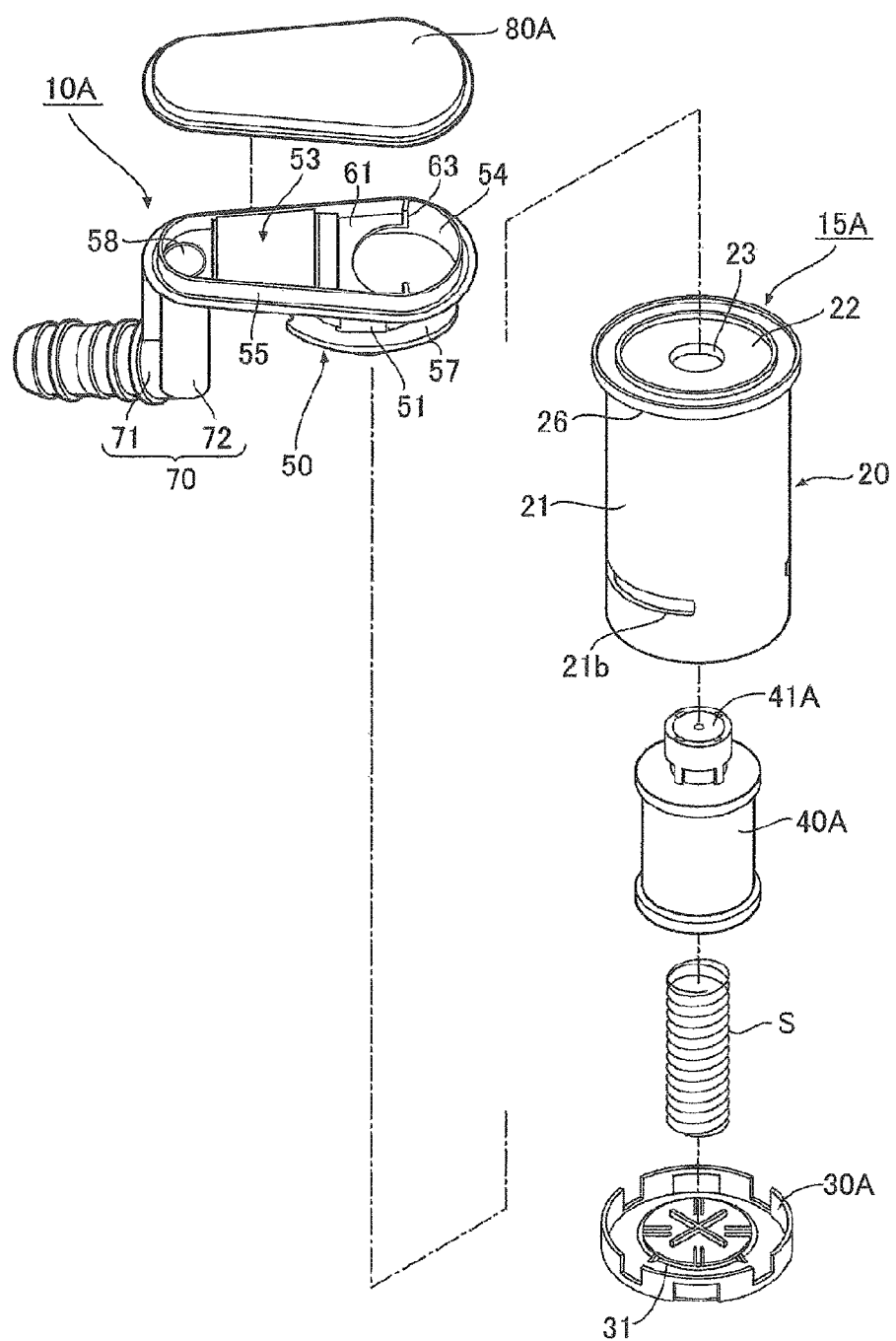
FIG. 5 is an exploded perspective view of a valve apparatus for a fuel tank according to another embodiment.
Figure 6:
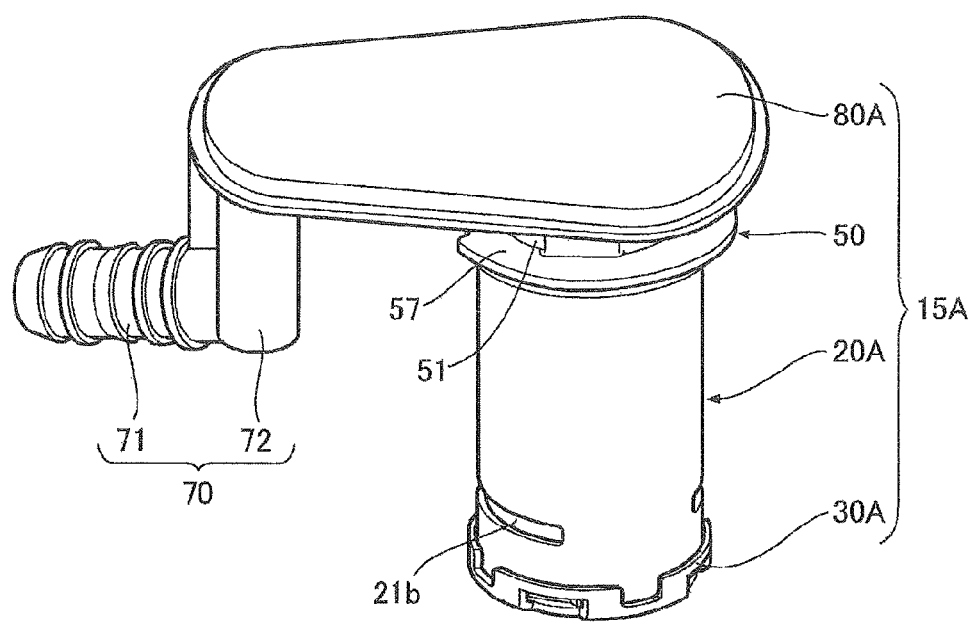
FIG. 6 is a perspective view of the valve apparatus.

As shown in FIG. 5 and FIG. 6, a valve apparatus 10A for a fuel tank in the present embodiment (hereinafter, referred to simply as the "valve apparatus 10A") includes a casing 20A to house a float valve 40A, a cap 30A mounted on the lower portion of the casing 20A, a cover 50 mounted on the upper portion of the casing 20A, and a ceiling wall 80A mounted on the upper portion of the cover 50.

The casing 20A includes a peripheral wall 21 having a circular cylindrical shape with its lower portion opened. The peripheral wall 21 includes a through-hole 21b. A partition wall 22 including a first opening 23 is provided above the casing 20A. An annular flange 26 is provided protruding from the outer peripheral edge of the partition wall 22.

A cap 30A is mounted on the lower opening portion of the casing 20A, whereby a valve chamber V is defined below the partition wall 22 (see FIG. 9). A float valve 40A is disposed in a vertically movable manner in the valve chamber V while a spring S interposed between the float valve 40A and the cap 30A. A valve head 41A that is swingable is mounted on the upper portion of the float valve 40A (see FIG. 5 and FIG. 9).

Figure 7:
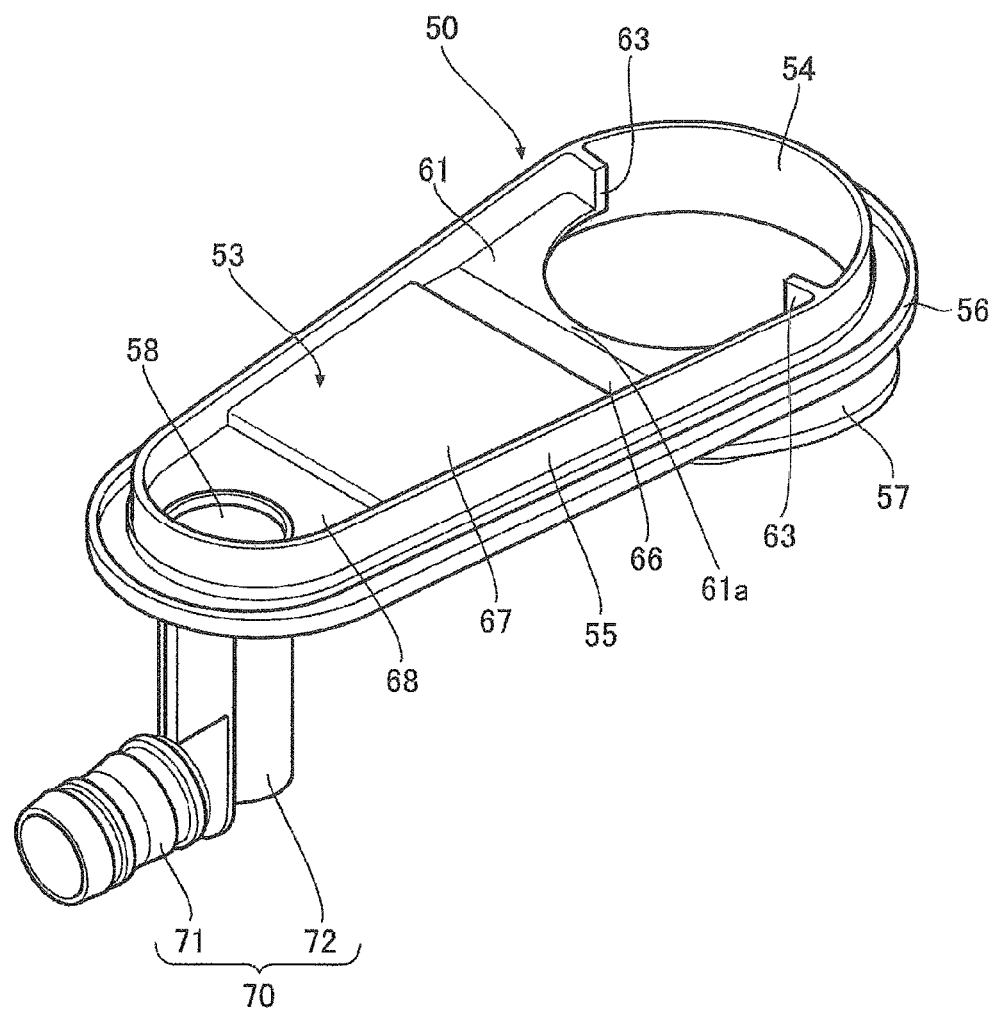
FIG. 7 is a perspective view of a cover of a housing of the valve apparatus.
Figure 8:
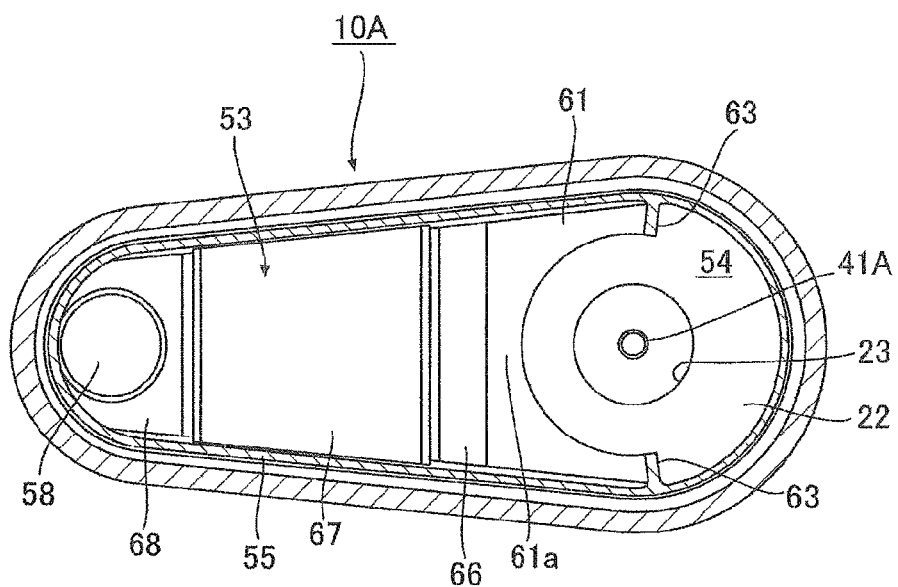
FIG. 8 is a plan view of the cover.

As shown in FIG. 7 and FIG. 8, the cover 50 mounted on the upper portion of the casing 20A includes a bottom wall 53 extending long with its one end decreased in width while being increased in width toward the other end, and an outer wall 55 having a frame shape that stands from the peripheral edge of the bottom wall 53. Thus, the cover 50 has a thin box shape including a lower portion and an outer periphery that are wall portions, and an upper portion that is opened. An annular wall portion 56 that is lower than the outer wall 55 is provided on the outer periphery of the outer wall 55.

As shown in FIG. 5 and FIG. 6, a cylinder portion 51 having an approximately circular cylindrical shape extends downward from the other end of the bottom wall 53 that is increased in width. The cylinder portion 51 is opened in a direction perpendicular to the bottom wall 53.

As shown in FIG. 6 and FIG. 7, a flange portion 57 extends from the outer peripheral edge at the lower end of the cylinder portion 51. Welding the flange portion 57 to the flange 26 of the casing 20A connects the cover 50 with the casing 20A (see FIG. 9).

As a result, the partition wall 22 of the casing 20A is disposed at the lower opening portion of the cylinder portion 51 while the first opening 23 is disposed inside the cylinder portion 51, and the valve chamber V is disposed below the first opening 23 (see FIG. 8 and FIG. 9).

As shown in FIG. 5 and FIG. 7, a concave portion 54 is provided inside a ventilation chamber R, which is lower than the bottom wall 53 and formed by the peripheral wall of the cylinder portion 51 and the partition wall 22 that is disposed on the bottom portion of the cylinder portion 51. The concave portion 54 defines a part of the ventilation chamber R while having a shape with its bottom portion including the first opening 23.

In the present embodiment, the upper face of the partition wall 22 of the casing 20A and the upper face of the bottom wall 53 of the cover 50 form a "bottom face" of the ventilation chamber R.

Figure 9:
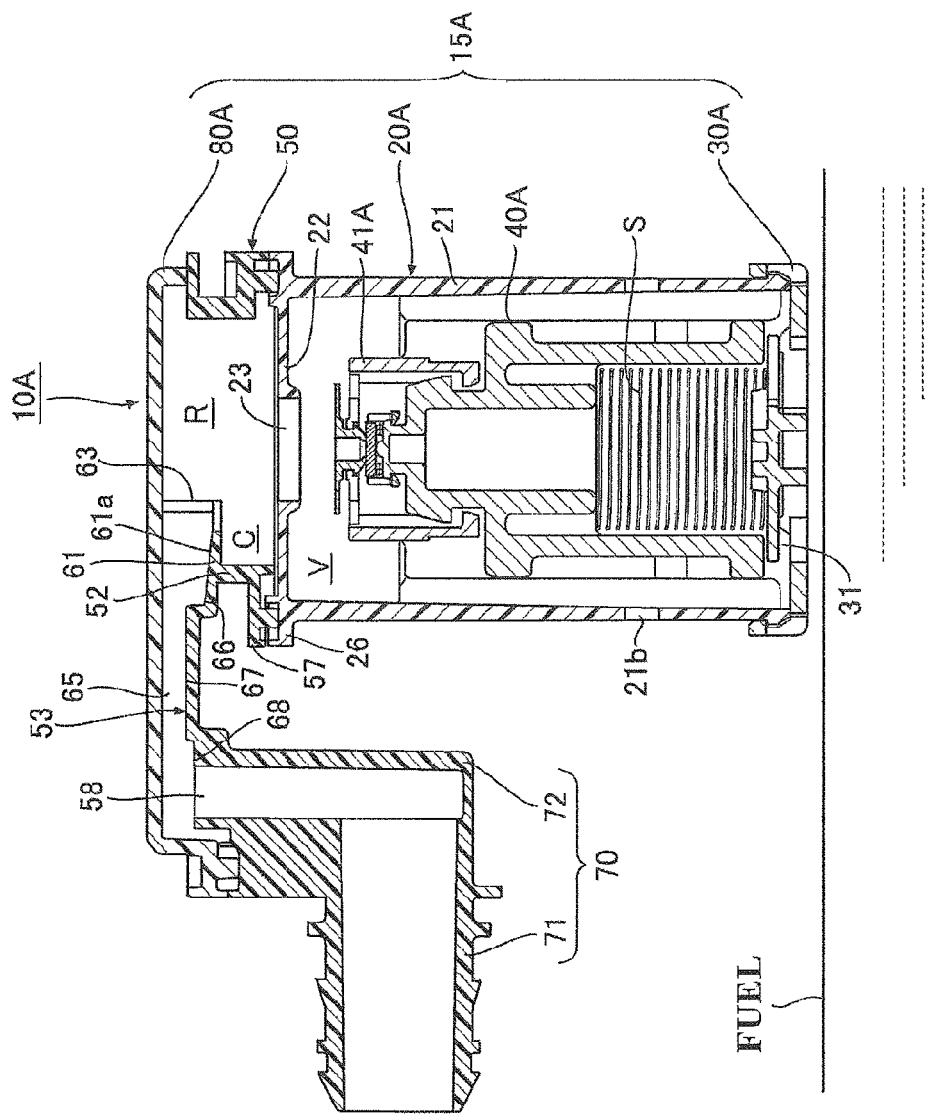
FIG. 9 is a cross-sectional view of the valve apparatus.

As shown in FIG. 7 to FIG. 9, a second opening 58 is disposed on the bottom face of the ventilation chamber R, that is, on the one end side of the bottom wall 53 that is decreased in width, the second opening 58 functioning as a fuel vapor discharge outlet arranged to discharge a fuel vapor that flows into the ventilation chamber R to the canister side that is outside of the fuel tank. As shown in FIG. 9, the peripheral edge portion of the second opening 58 is disposed at a position higher than the peripheral edge portion of the first opening 23 with respect to the axial direction of the casing 20A.

A canister-connecting pipe 70 is provided to the peripheral wall 21 of the casing 20A so as to extend therefrom, and is used to be connected to a pipe connected to a canister (not illustrated) disposed outside of the fuel tank.

As shown in FIG. 6, FIG. 7, and FIG. 9, the canister-connecting pipe 70 in the present embodiment includes a distal end portion 71 that extends parallel to the bottom wall 53, and a base portion 72 that stands at an approximately right angle from the end portion of the distal end portion 71, extends along the axial direction of the casing 20A, and is connected to the bottom wall 53. The base portion 72 of the canister-connecting pipe 70 is distanced with respect to the peripheral wall 21 that constitutes the valve chamber V of the casing 20A, and the opening at the upper end of the base portion 72 communicates with the second opening 58.

The canister-connecting pipe 70 is not limited to the above-described shape.

As shown in FIG. 9, in the present embodiment, the portion that is a part of the cylinder portion 51 of the cover 50 and is disposed between the peripheral edge portion of the first opening 23 on the bottom face of the ventilation chamber R and the second opening 58 defines a standing wall 52.

An overhang wall portion (eave wall portion) 61 that extends from the side face of the standing wall 52 toward the first opening 23 is provided. The overhang wall portion 61 in the present embodiment has an arc rib shape of extending from the upper end on the outside face of the standing wall 52 toward the radial inner direction of the concave portion 54.

The overhang wall portion 61 is extended and inclined such that a distal end side of an upper face of the overhang wall portion 61 is nearer to the peripheral edge portion of the first opening 23 as compared with a based end side thereof, as shown in FIG. 9.

In the present embodiment, a tapered face 61a that gradually lowers toward the peripheral edge portion of the first opening 23 is provided in the area from the base end side of the overhang wall portion 61 to the slightly near side of the distal end side of the overhang wall portion 61 on the upper face of the overhang wall portion 61.

The overhang wall portion is not limited to the above-described shape.

As shown in FIG. 7 to FIG. 9, a pair of ribs 63 and 63 are provided on both sides of the overhang wall portion 61 in the circumferential direction so as to protrude to the radial inner direction of the concave portion 54 and extend along the vertical direction of the concave portion 54.

In the present embodiment, a liquid reservoir space C is provided in the space surrounded by the partition wall 22 of the casing 20A, the standing wall 52 of the cover 50, the overhang wall portion 61, and the pair of ribs 63 and 63, and liquid fuel flowing into the ventilation chamber R from the first opening 23 stands in the liquid reservoir space C as shown in FIG. 9.

In the present embodiment, a passage 65 having a predetermined gap is provided in the space surrounded by the bottom wall 53 and the outer wall 55 of the cover 50, the overhang wall portion 61, and the inner peripheries of the ceiling wall 80A in a state where the ceiling wall 80A is mounted on the upper portion of the cover 50 (see FIG. 9).

As shown in FIG. 9, the passage 65 is provided at the portion from the distal end of the overhang wall portion 61 to the peripheral edge portion of the second opening 58. The bottom face of the passage 65 (in the present embodiment, the upper face of the bottom wall 53) has a step-like shape that becomes higher toward the peripheral edge portion of the second opening 58.

Referring also to FIG. 7 and FIG. 8, the bottom face of the passage 65 in the present embodiment includes a first bottom face 66 that is disposed on the side of the first opening 23 so as to be continuous with the overhang wall portion 61, and a second bottom face 67 that is disposed on the side of the second opening 58 so as to be continuous with the first bottom face 66 and is higher than the first bottom face 66.

The bottom face of the passage 65 includes a third bottom face 68 that is disposed so as to be continuous with the second bottom face 67, is lower than the second bottom face 67 and higher than the first bottom face 66, and includes the second opening 58. The second bottom face 67 defines the "portion higher than the peripheral edge portion of the second opening".

As described above in the present embodiment, while the bottom face of the passage 65 has the configuration of having a step-like shape made up from the three bottom faces including the first bottom face 66, the second bottom face 67, and the third bottom face 68, where the highest second bottom face 67 is disposed between the first bottom face 66 and the third bottom face 68, the present invention is not limited to the present embodiment.

For example, the bottom face of the passage 65 may have a tapered shape formed gradually higher toward the peripheral edge portion of the second opening 58 in the area ranging from the base end side of the overhang wall portion 61 to the peripheral edge portion of the second opening 58 (that is, not a step-like shape shown in FIG. 9). A portion protruding in a semicircle shape, protruding in an arc shape, or protruding partially may be provided to a part of the area from the base end of the overhang wall portion 61 to the peripheral edge portion of the second opening 58 on the bottom face of the passage 65. It is enough that the bottom face of the passage includes a higher portion formed toward the peripheral edge portion of the second opening.

The passage 65 is arranged to make the air or fuel vapor in the fuel tank that flows into the ventilation chamber R through the first opening 23 flow into the second opening 58, and to discharge the air or the fuel vapor to the canister outside of the fuel tank (not illustrated) through the canister-connecting pipe 70 or a pipe connected thereto (not illustrated).

Next, operation and effect of the valve apparatus 10A will be described.

Figure 10:
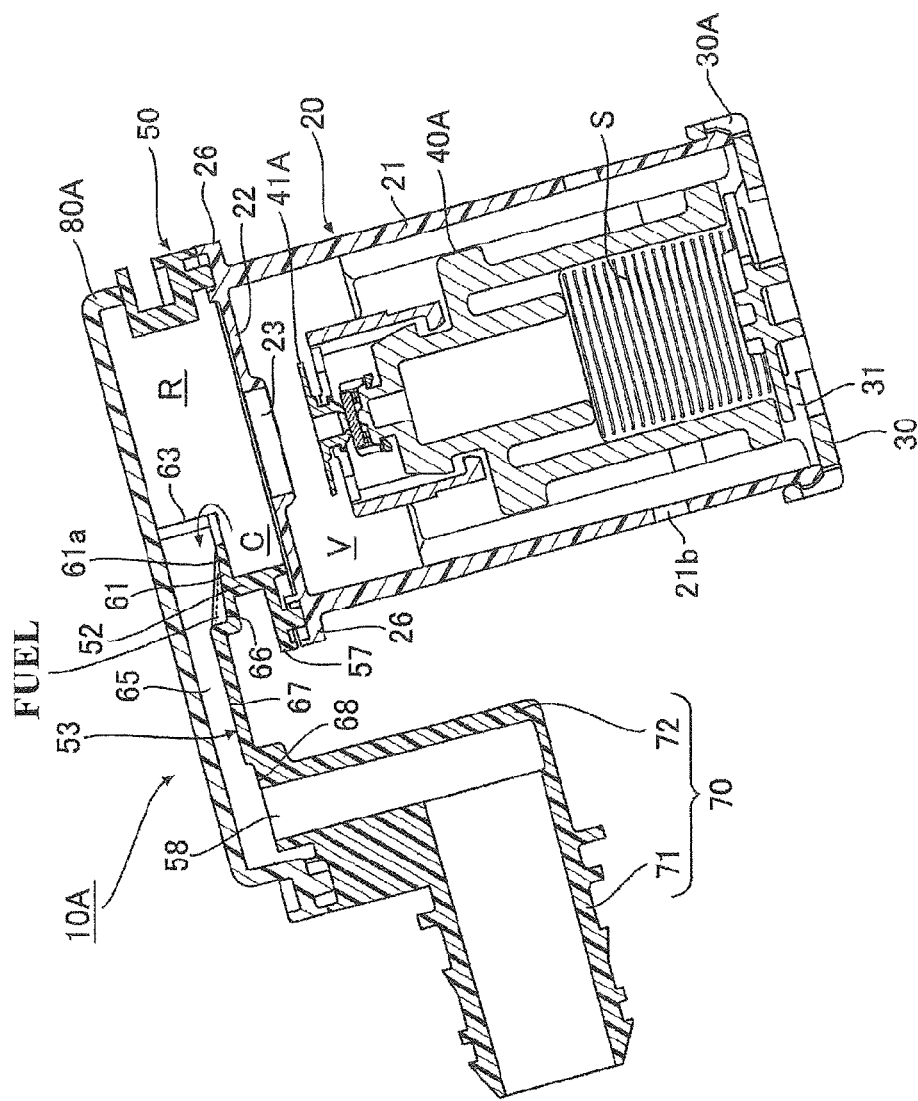
FIG. 10 is a cross-sectional view of the valve apparatus in a state where the vehicle is inclined.

Also in the present embodiment, for example, when the vehicle inclines at a predetermined angle, the fuel can be dammed inside the liquid reservoir space C that is defined by the standing wall 52 between the peripheral edge of the first opening 23 and the peripheral edge of the second opening 58, the overhang wall portion 61 extending from the side face of the standing wall 52, the pair of ribs 63 and 63, and the partition wall 22 of the casing 20A as shown in FIG. 10. Thus, the fuel may not easily flow toward the second opening 58 communicating with the canister-connecting pipe 70 through the passage 65, which can prevent the fuel from flowing into that canister.

In the present embodiment, the tapered face 61a is provided on the upper face of the overhang wall portion 61, and the overhang wall portion 61 extends and is inclined such that the distal end side thereof is nearer to the peripheral edge portion of the first opening 23 as compared with the base end side thereof. Thus, when the fuel flowing into the ventilation chamber R from the first opening 23 gets on the upper face of the overhang wall portion 61 as shown in FIG. 10, the fuel can be easily returned toward the first opening 23.

In the present embodiment, the bottom faces 66 and 67 of the passage 65, which are provided in the area from the distal end of the overhang wall portion 61 to the peripheral edge portion of the second opening 58, are formed in a step-like shape to be higher toward the peripheral edge portion of the second opening 58. Therefore, even if the fuel, which flows into the ventilation chamber R when the vehicle gets inclined, overflows from the liquid reservoir space C (see the arrow in FIG. 10) as shown in FIG. 10, and gets on the overhang wall portion 61, the fuel can be made not to easily flow toward the second opening 58 by the step-like bottom faces 66 and 67 of the passage 65, which can more effectively prevent the fuel from flowing into the second opening 58.

In the present embodiment, because the canister-connecting pipe 70 is distanced with respect to the peripheral wall 21 of the casing 20A that constitutes the valve chamber V of the housing 15A, a long distance can be secured between the first opening 23 and the second opening 58, whereby the fuel may not easily flow toward the second opening 58.

Taking formability of the overhang wall portion 61 into consideration in forming the overhang wall portion 61, the housing 15A is, for example, divided into the casing 20A including the valve chamber V and the canister-connecting pipe 70, and the cover 50 mounted on the upper portion of the casing 20A. In this case, because the canister-connecting pipe 70 is distanced with respect to the peripheral wall 21 of the casing 20A in the present embodiment, the casing 20A is easy to grasp by using the gap, which can improve mounting workability of the cover 50.

The invention claimed is:

1. A valve apparatus to be mounted on a fuel tank, the valve apparatus including:

a housing including a ventilation chamber on a bottom face of which a first opening and a second opening are provided, and a valve chamber communicating with the first opening and disposed below the ventilation chamber, and a float valve disposed in the valve chamber in a vertically movable manner so as to open and close the first opening, wherein the housing includes a canister-connecting pipe extending so as to receive a pipe thereon, the pipe being connected to a canister which is provided outside of the fuel tank, the canister-connecting pipe communicating with the second opening, wherein a portion of the bottom face of the ventilation chamber forms a partition wall where the first opening is provided, wherein a standing wall is disposed on the partition wall between a peripheral edge portion of the first opening and a peripheral edge portion of the second opening, the peripheral edge portion of the first opening and the peripheral edge portion of the second opening being on opposite sides of the standing wall with respect to a line passing through the standing wall and parallel to an axial direction of the fuel tank, wherein an overhang wall portion extends from a side face of the standing wall toward the first opening, as viewed from above, wherein a liquid reservoir space is provided between the partition wall, the standing wall, and the overhang wall portion so as to allow liquid fuel flowing into the ventilation chamber from the first opening to stand in the liquid reservoir space.

2. The valve apparatus of claim 1,
wherein the canister-connecting pipe is distanced with respect to a peripheral wall of the housing which forms the valve chamber.

3. The valve apparatus of claim 1, wherein the liquid reservoir space is provided such that when the valve apparatus is inclined and fuel flows into the ventilation chamber from the first opening, the fuel flowing therein is dammed inside the liquid reservoir space.

4. The valve apparatus of claim 1, wherein the overhang wall portion does not overlap with the first opening.

5. The valve apparatus of claim 1, wherein the liquid reservoir space is separate from the valve chamber.

6. The valve apparatus of claim 1, wherein the standing wall is disposed at an end of the partition wall nearest the canister-connecting pipe.

7. The valve apparatus of claim 6, wherein the partition wall, the standing wall, and the overhang wall portion collectively form the liquid reservoir space.

8. The valve apparatus of claim 6, wherein the standing wall extends outwardly from the partition wall and the overhang wall portion extends from a proximal end of the standing wall over the partition wall towards the first opening.

9. The valve apparatus of claim 6, wherein a line drawn perpendicularly through a proximal end of the overhang wall portion and a line drawn perpendicularly through an end of the partition wall nearest the standing wall are skew lines.

10. A valve apparatus to be mounted on a fuel tank, the valve apparatus including:

a housing including a ventilation chamber on a bottom face of which a first opening and a second opening are provided, and a valve chamber communicating with the first opening and disposed below the ventilation chamber, and a float valve disposed in the valve chamber in a vertically movable manner so as to open and close the first opening, wherein the housing includes a canister-connecting pipe extending so as to receive a pipe thereon, the pipe being connected to a canister which is provided outside of the fuel tank, the canister-connecting pipe communicating with the second opening, wherein a standing wall is disposed on the bottom face of the ventilation chamber between a peripheral edge portion of the first opening and a peripheral edge portion of the second opening, wherein an overhang wall portion extends from a side face of the standing wall toward the first opening, as viewed from above, and wherein the overhang wall portion is extended and inclined such that a distal end side of an upper face of the overhang wall portion is nearer to the peripheral edge portion of the first opening as compared with a base end side thereof.

11. A valve apparatus to be mounted on a fuel tank, the valve apparatus including:

a housing including a ventilation chamber on a bottom face of which a first opening and a second opening are provided, and a valve chamber communicating with the first opening and disposed below the ventilation chamber, and a float valve disposed in the valve chamber in a vertically movable manner so as to open and close the first opening, wherein the housing includes a canister-connecting pipe extending so as to receive a pipe thereon, the pipe being connected to a canister which is provided outside of the fuel tank, the canister-connecting pipe communicating with the second opening, wherein a standing wall is disposed on the bottom face of the ventilation chamber between a peripheral edge portion of the first opening and a peripheral edge portion of the second opening, wherein an overhang wall portion extends from a side face of the standing wall toward the first opening, as viewed from above, wherein a passage is provided between the distal end of the overhang wall portion to the peripheral edge portion of the second opening, and wherein a bottom face of the passage includes a portion higher than the peripheral edge portion of the second opening.

* * * * *